(12) United States Patent  
Zhang et al.

(10) Patent No.: US 9,177,131 B2
(45) Date of Patent: Nov. 3, 2015

(54) USER AUTHENTICATION METHOD AND APPARATUS BASED ON AUDIO AND VIDEO DATA

(71) Applicant: Tencent Technology (Shenzhen) Company Limited, Shenzhen (CN)

(72) Inventors: Xiang Zhang, Shenzhen (CN); Li Lu, Shenzhen (CN); Eryu Wang, Shenzhen (CN); Shuai Yue, Shenzhen (CN); Feng Rao, Shenzhen (CN); Haibo Liu, Shenzhen (CN); Lou Li, Shenzhen (CN); Duling Lu, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/262,665

(22) Filed: Apr. 25, 2014

(65) Prior Publication Data

US 2014/0237576 A1  Aug. 21, 2014

Related U.S. Application Data

(63) Continuation of application No. PCT/CN2013/087994, filed on Nov. 28, 2013.

(30) Foreign Application Priority Data

Jan. 29, 2013 (CN) .......................... 2013 1 0033654

(51) Int. Cl.
*H04L 29/06* (2006.01)
*G06F 21/32* (2013.01)

(52) U.S. Cl.
CPC ........ *G06F 21/32* (2013.01); *G06F 2221/2117* (2013.01)

(58) Field of Classification Search
CPC .................................. G06F 21/32; G06F 21/31
USPC ............................................................ 726/7
See application file for complete search history.

(56) References Cited

U.S. PATENT DOCUMENTS

| 6,038,334 | A  | * | 3/2000 | Hamid ........................... 382/124 |
| 6,256,737 | B1 | * | 7/2001 | Bianco et al. ................. 713/186 |
| 2003/0115473 | A1 | | 6/2003 | Sugimura et al. |
| 2006/0206724 | A1 | * | 9/2006 | Schaufele et al. ............ 713/186 |

FOREIGN PATENT DOCUMENTS

| CN | 101075868 A | 11/2007 |
| CN | 101256700 A | 9/2008 |
| CN | 202003365 U | 10/2011 |

OTHER PUBLICATIONS

Tencent Technology, ISR, PCT/CN2013/087994, Mar. 13, 2014, 3 pgs.

\* cited by examiner

*Primary Examiner* — Jason K Gee
(74) *Attorney, Agent, or Firm* — Morgan, Lewis & Bockius LLP

(57) ABSTRACT

A computer-implemented method is performed at a server having one or more processors and memory storing programs executed by the one or more processors for authenticating a user from video and audio data. The method includes: receiving a login request from a mobile device, the login request including video data and audio data; extracting a group of facial features from the video data; extracting a group of audio features from the audio data and recognizing a sequence of words in the audio data; identifying a first user account whose respective facial features match the group of facial features and a second user account whose respective audio features match the group of audio features. If the first user account is the same as the second user account, retrieve the sequence of words associated with the user account and compare the sequences of words for authentication purpose.

20 Claims, 5 Drawing Sheets

USER AUTHENTICATION METHOD AND APPARATUS BASED ON AUDIO AND VIDEO DATA

RELATED APPLICATIONS

This application is a continuation application of PCT Patent Application No. PCT/CN2013/087994, entitled "USER AUTHENTICATION METHOD AND APPARATUS BASED ON AUDIO AND VIDEO DATA" filed Nov. 28, 2013, which claims priority to Chinese Patent Application No. 201310033654.X, "User authentication method and apparatus based on audio and video data", filed on Jan. 29, 2013, both of which are hereby incorporated by reference in their entirety.

FIELD OF THE INVENTION

The present application generally relates to internet technologies, in particular to a user authentication method and apparatus based on audio and video data.

BACKGROUND OF THE INVENTION

Currently, frequently used methods of user authentication are as follows.

Method 1: Method 1 is based on a user account and a password, which is commonly used at present. In this method, each user has a specific account binding to a corresponding password. The server could check whether the password input by the user is the same as the password binding to this account when authenticating a user by his account. If the two passwords are the same, the user will be authenticated; otherwise, the user will not be authenticated.

Method 2: Method 2 is based on the recognition of the user's face. Under this method, a facial image could be collected by cameras. According to the collected face image, a computer locates a region that contains a human face in the image, and extracts the facial features included in this region. The computer then further identifies the person's identity and information from a face database.

Method 3: Method 3 is based on voiceprint identification authentication. Under this method, speaker's voice data could be collected by microphones and other recording devices. According to the collected voice data, a computer extracts the voice information of the speaker and then identifies the speaker's identity and information from a voiceprint database.

However, in the above three methods, Method 1 requires the user to manually enter the account and password, and it has risk of being hacked. For Method 2, it is easy to get through the authentication by illegal personnel through acquired photos or videos of the user published on internet. For Method 3, an unauthorized user is easy to get through the authentication by recording the voice of the user.

Therefore, it is desirable to have a method for authenticating a user easily and safely. Such a method should release a user from the labor of inputting a password. At the same time, the method should be very difficult to be hacked.

SUMMARY

The present application provides a user authentication method and apparatus based on audio and video data to improve upon and avoid many risks of existing user authentication methods.

In accordance with some embodiments of the present application, a computer-implemented method is performed at a server having one or more processors and memory storing programs executed by the one or more processors. The method comprises: receiving a login request from a mobile device, the login request including video data and audio data; extracting a group of facial features from the video data; extracting a group of audio features from the audio data and recognizing a sequence of words in the audio data; identifying, in a user account database, a first user account whose respective facial features match the group of facial features according to first predefined criteria; identifying, in the user account database, a second user account whose respective audio features match the group of audio features according to second predefined criteria; if the first user account is the same as the second user account: comparing the recognized sequence of words with a predefined sequence of words associated with the first user account; and authenticating the login request if the recognized sequence of words matches the predefined sequence of words according to third predefined criteria; if the first user account is different from the second user account: returning a response to the mobile device, indicative of the denial of the login request.

In accordance with some embodiments of the present application, a server computer comprises one or more processors: memory; and one or more programs stored in the memory and to be executed by the processor. The one or more programs include instructions for: receiving a login request from a client device, the login request including video data and audio data; extracting a group of facial features from the video data; extracting a group of audio features from the audio data and recognizing a sequence of words in the audio data; identifying, in a user account database, a first user account whose respective facial features match the group of facial features according to first predefined criteria; identifying, in the user account database, a second user account whose respective audio features match the group of audio features according to second predefined criteria; if the first user account is the same as the second user account: comparing the recognized sequence of words with a predefined sequence of words associated with the first user account; and authenticating the login request if the recognized sequence of words matches the predefined sequence of words according to third predefined criteria; if the first user account is different from the second user account: returning a response to the client device, indicative of the denial of the login request.

In accordance with some embodiments of the present application, a non-transitory computer readable storage medium stores one or more programs for execution by one or more processors of a computer system, the one or more programs including instructions for: receiving a login request from a client device, the login request including video data and audio data; extracting a group of facial features from the video data; extracting a group of audio features from the audio data and recognizing a sequence of words in the audio data; identifying, in a user account database, a first user account whose respective facial features match the group of facial features according to first predefined criteria; identifying, in the user account database, a second user account whose respective audio features match the group of audio features according to second predefined criteria; if the first user account is the same as the second user account: comparing the recognized sequence of words with a predefined sequence of words associated with the first user account; and authenticating the login request if the recognized sequence of words matches the predefined sequence of words according to third predefined criteria; if the first user account is different from the second user account: returning a response to the client device, indicative of the denial of the login request.

BRIEF DESCRIPTION OF THE DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION OF THE INVENTION

In order to describe the purpose, technical solutions and advantages of the invention more clearly, figures and embodiments are included to describe the invention in detail.

Figure 1:
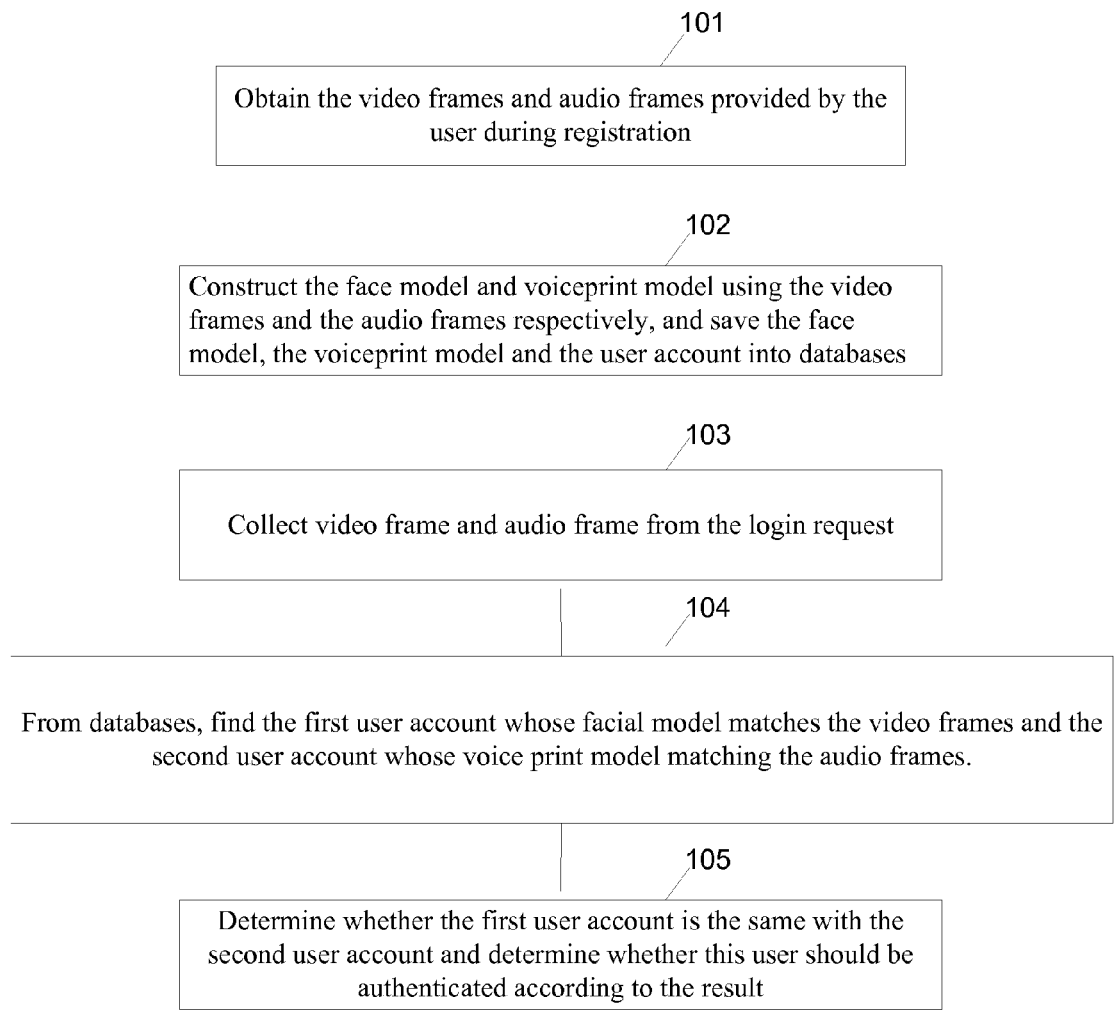
FIG. 1 is a flowchart of an authenticating method in accordance with some embodiments.

FIG. 1 is a flowchart of an authenticating method in accordance with some embodiments.

In step 101, a server computer obtains the video frames and audio frames provided by the user during registration.

During the user registration, a mobile device collects continuous multi-frame images (video data) of the user through a camera and a continuous multi-frame voice (audio data) of the user through a microphone. The collected video and audio data are then obtained by the server computer through data transmission from the mobile device.

Figure 5:
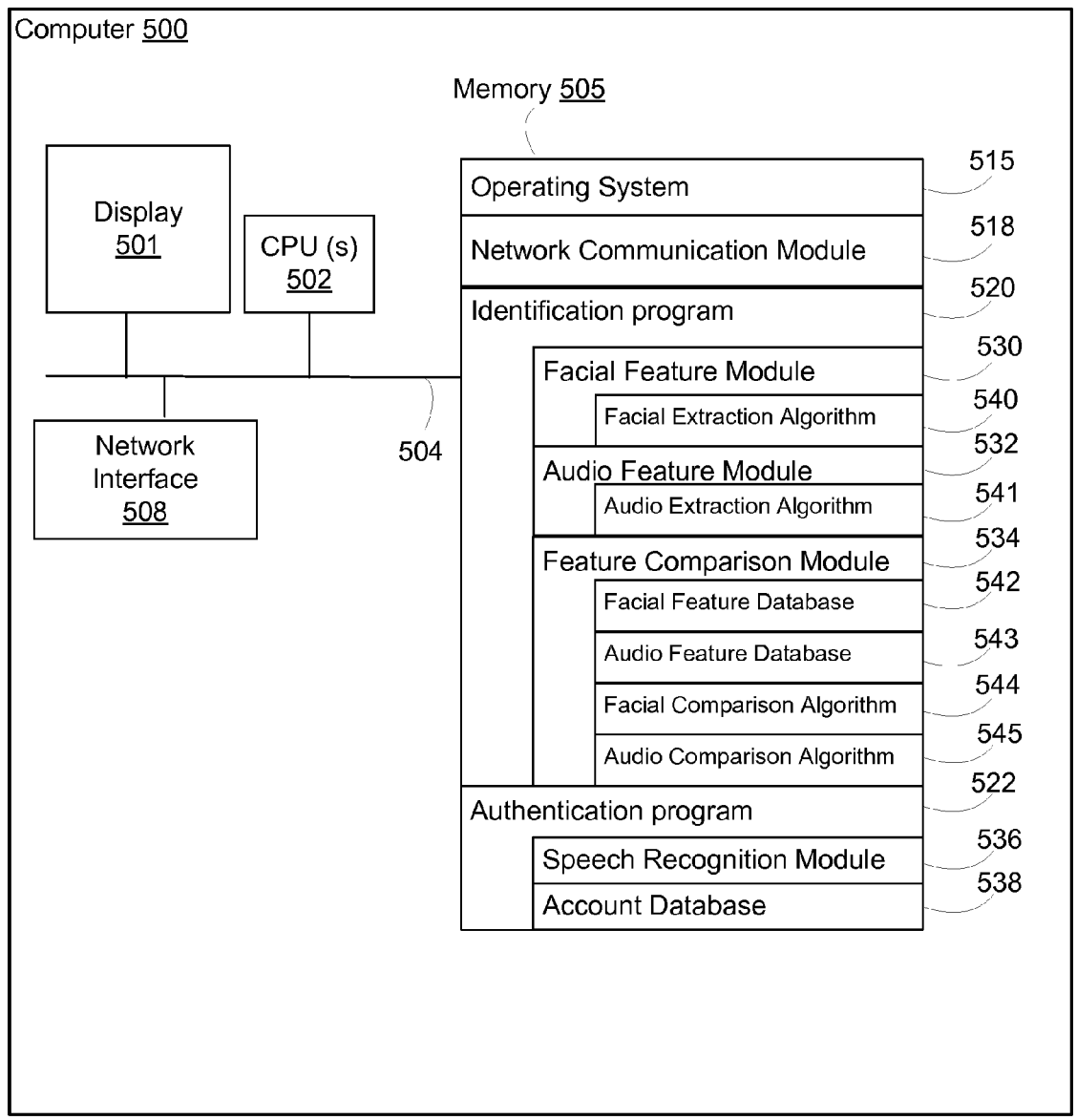
FIG. 5 is a schematic structural diagram of an authenticating server in accordance with some embodiments.

In step 102, the server constructs a face model and a voiceprint model using the video frames and the audio frames respectively, and save the face model, the voiceprint model and the user account into databases as illustrated in FIG. 5.

In accordance with some embodiments, the user account includes information of the user account name, the user ID, and so on.

The process of constructing a face model includes: positioning the face region in the video frames; extracting facial features from the face region; constructing corresponding face model with the facial features.

Preferably, the extracted facial features include human face texture. Suitable existing face recognition techniques are employed in some embodiments as well.

In accordance with some embodiments, the process of constructing the voiceprint model with audio frames with steps includes: extracting audio features from audio frames and constructing corresponding a voiceprint model with audio features. The audio features include Perceptual Linear Predictive, or Mel Frequency Cepstral Coefficient data.

In accordance with some embodiments, the databases in step 102 are included in one database. Alternatively there are separate and independent databases to store face models, voiceprint models and user accounts.

In step 103, the server collects video frames and audio frames from the login request.

When user login or view information on a Web site, in order to ensure network security, the user's identity need to be authenticated. In present application, in the process of authentication, the user's video frames could be collected by a camera while his audio frames could be collected by a microphone.

In step 104, from databases, the server finds the first user account whose facial model matches the video frames and the second user account whose voice print model matching the audio frames.

In accordance with some embodiments, the face model matching the collected video frames from the database in step 104 is found with steps including positioning the face region from the collected video frames, extracting facial features from the face region, constructing corresponding face model with the facial features, and finding a face model matching the constructed face model.

After finding the matching face model, the server uses the found face model to search the corresponding user account from all the user accounts stored in the database. Since the database store the face model, voiceprint and user account correspondingly, it is easy to find corresponding user account. For the convenience of description, consider the found user account as the first user account.

In accordance with some embodiments, in step 104, the steps of finding voiceprint model matching the collected audio frames from the database include: extracting audio features from the collected audio frames, searching voiceprint model with collected audio features in all the voiceprint models saved in the database.

After finding the matching voiceprint model, the server uses this voiceprint model to search the corresponding user account from all the user accounts stored in the database. Since the databases store the face models, voiceprint models and user accounts correspondingly, it is easy to find the corresponding user account. For the convenience of description, consider the found user account as the second user account.

In step 105, the server determines whether the first user account is the same with the second user account and determines whether this user should be authenticated according to the result.

In accordance with some embodiments, in step 105, steps of determining whether the user should be authenticated include: if the first account is the same as the second account, the user is authenticated; if the result is that the first account is different from the second account, the user is not authenticated.

In accordance with some embodiments, once the user is authenticated, a successful authentication reminder is sent back to the user. Alternatively, the server directly logs into the user account and shows the user's information to the user. The implementations vary among different practical applications.

It should be noted that, in the flowchart shown in FIG. 1, in step 104, if the face model matching the collected video frames cannot be found in the database, or the voiceprint model matching the collected audio frames cannot be found from the database, the user is not to be authenticated.

Figure 2:
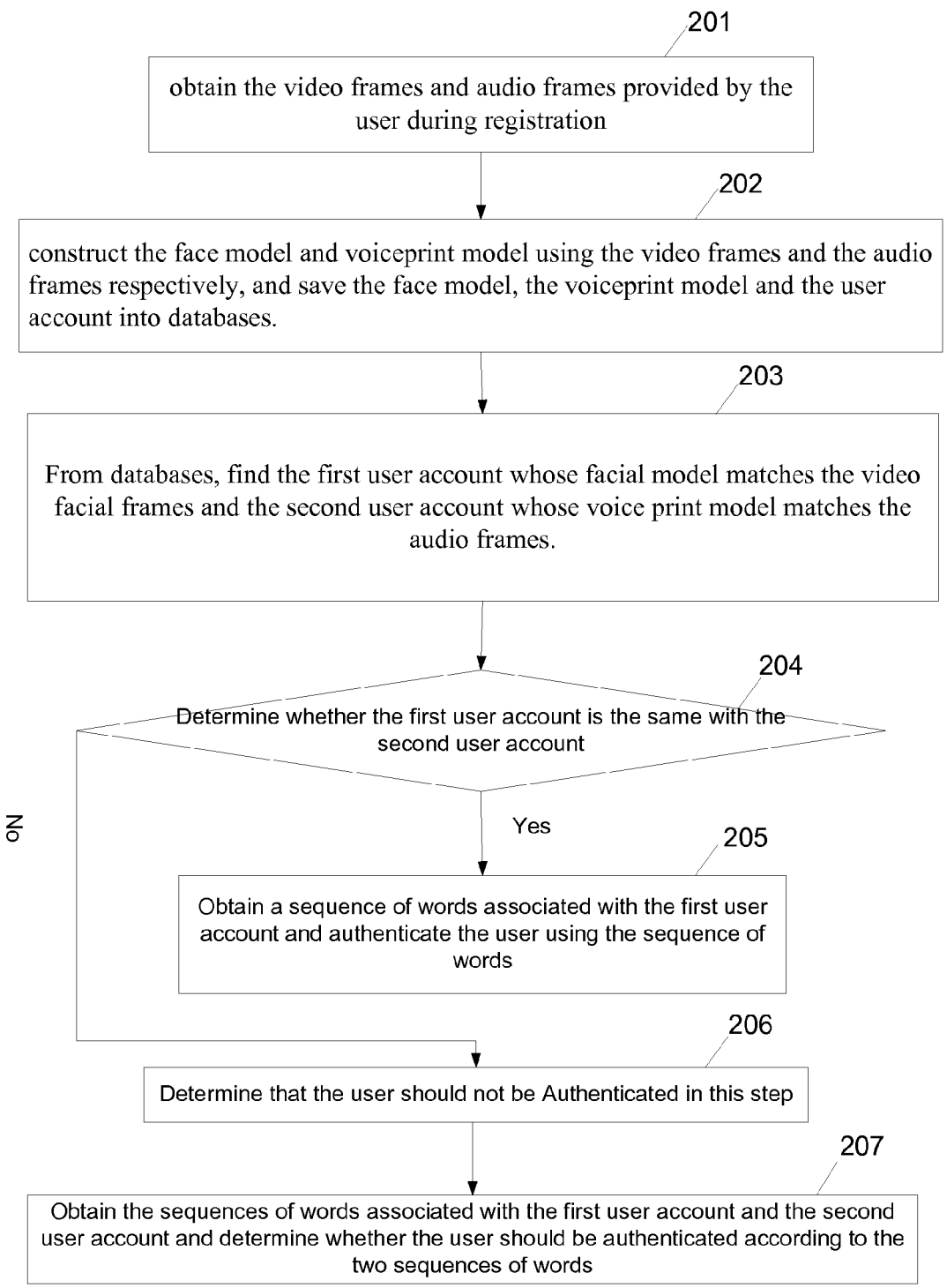
FIG. 2 is a flowchart of an authenticating method in accordance with some embodiments.

FIG. 2 is a flowchart of an authenticating method in accordance with some embodiments.

In step 201, the server obtains the video frame and audio frame provided by the user during registration. The method of obtaining the video frames and audio frames is the same as illustrated in step 101 of FIG. 1.

In step 202, the server constructs the face model and voiceprint model using the video frame and the audio frame respectively, and saves the face model, the voiceprint model and user account into databases.

In step 203, from databases, the server finds the first user account whose facial model matches the video facial frames and the second user account whose voice print model matching the audio frames.

In step 204, the server determines whether the first user account is the same with the second user account. If they are the same, go to step 205; if not, go to step 206.

In step 205, the server obtains a sequence of words associated with the first user account and authenticates the user using the sequence of words.

In step 206, the server determines that the user should not be authenticated in this step.

Step 207 is optional in accordance with some embodiments. In step 207, the server obtains the sequences of words associated with the first user account and the second user account and determines whether the first and second sequences of words are the same. If the first and second sequences of words are the same, the user is authenticated. Otherwise, the user is not authenticated.

It should be noted that in some embodiments of the present application, the processes of FIG. 1 and FIG. 2 are applied to the server. In some practical implementation, the server is a cloud server. Therefore, in accordance with some embodiments, the video frames, audio frames and the sequence of words provided by the user during registration are obtained by the server through common data transmission methods from the mobile device. The common transmission methods with the mobile device include any agreement based on the using of Internet, such as HTTP protocol, TCP protocols, etc.

Figure 3:
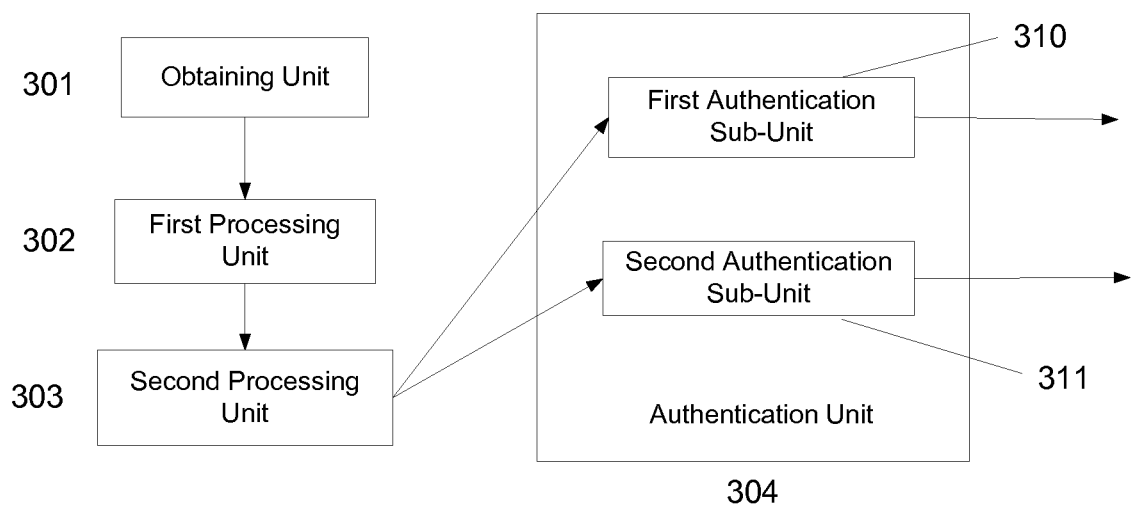
FIG. 3 is a schematic structural diagram of an authenticating device in accordance with some embodiments.

FIG. 3 is a schematic structural diagram of an authenticating device in accordance with some embodiments.

In the embodiments illustrated in FIG. 3, the authenticating device comprises obtaining unit 301, first processing unit 302, second processing unit 303, and authentication unit 304. In accordance with some embodiments, the authenticating device is a server.

The obtaining unit 301 is configured to obtain the video frames and audio frames provided by the user during registration. In some embodiments, a mobile device sends the collected video frames and audio frames to the server through data transmission. The obtaining unit 301 then obtains the video frames and audio frames provided by the user during registration.

The first processing unit 302 is configured to construct the face model and voiceprint model with the video frames and audio frames, and save the face models, voiceprint models and user accounts into databases.

The second processing unit 303 is configured to find the first user account whose facial model matches the video facial frames and the second user account whose voice print model matching the audio frames from databases.

The authentication unit 304 is configured to compare the first user account with the second user account, to authenticate the user if the two accounts are the same and to deny authentication if the two accounts are different.

The authentication unit 304 comprises first authentication sub-unit 310 and second authentication sub-unit 311.

The first authentication sub-unit 310 is configured to obtain the sequence of words corresponding to the first user account from the database and use this sequence of words to determine whether the user should authenticated.

The second authentication sub-unit 311 is configured to obtain the sequences of words corresponding to the first user account and the second user account and determine whether the two sequences of words are the same. The second authentication sub-unit 311 is configured to carry out step 207 as illustrated in FIG. 2.

Figure 4:
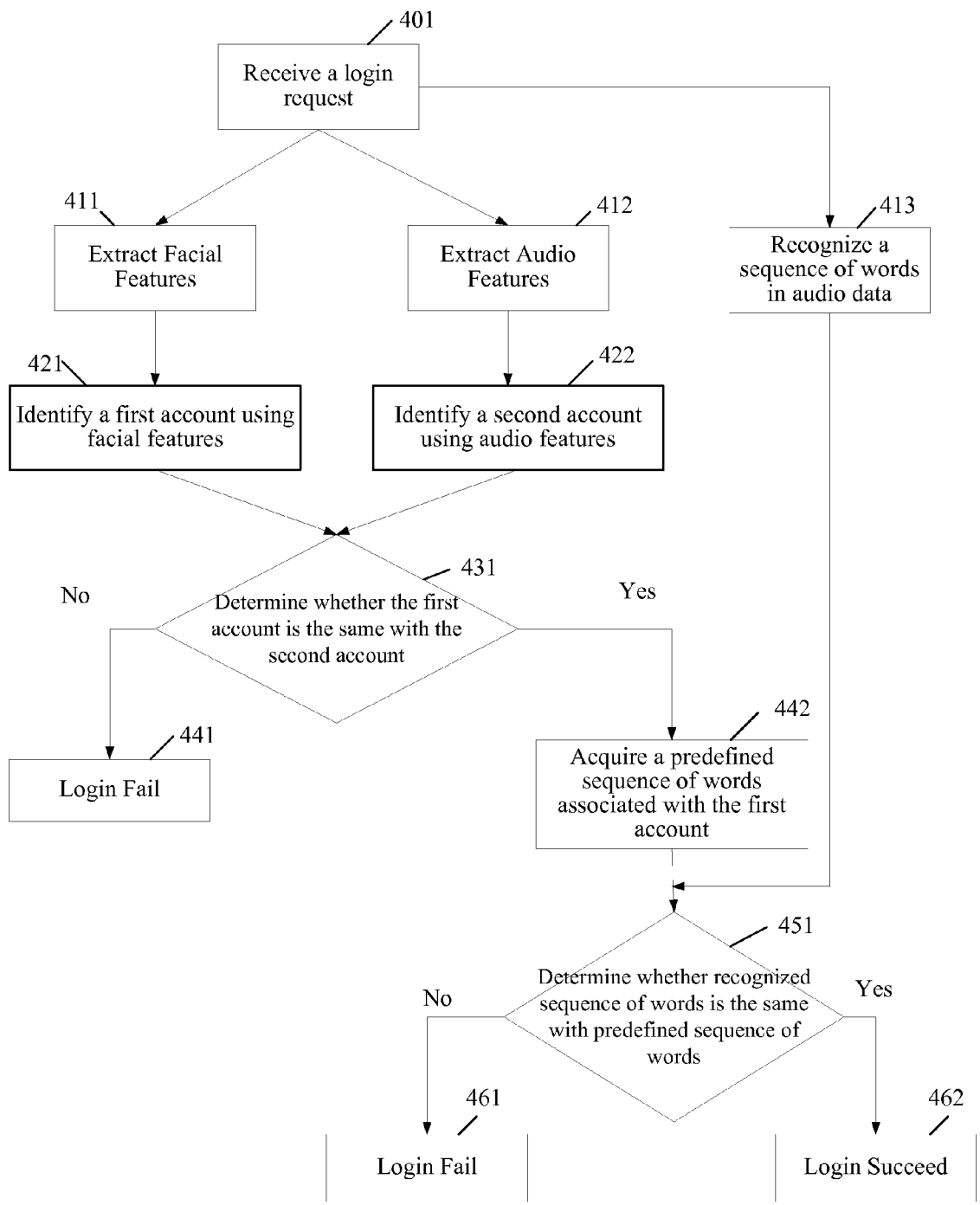
FIG. 4 is a flowchart of an authenticating method in accordance with some embodiments.

FIG. 4 is a flow chart of a method for authenticating a user in accordance with some embodiments. The method is performed at a server having one or more processors and memory storing programs executed by the one or more processors.

In step 401, the server receives a login request from a mobile device, the login request including video data and audio data. The video data and audio data are obtained from the user of the mobile device with one of various means. In accordance with some embodiments, when a user tries to use a Smartphone to connect with a remote server, the Smartphone uses its camera to produce a video with the user's face and asks the user to say a sequence of words which are to be recorded through a microphone. For example, the Smartphone may ask the user, "what is name of your favorite movie?" The video and the recorded voice are the video data and audio data, respectively. As a result, the video data comprises multiple frames of images that contain the same human face and the audio data comprises a human voice. The Smartphone then sends a login request along with the video data and audio data to the server through an established connection. The login request can be sent with from one of several applications of the Smartphone. The server can be a specifically designed login server or a server also serving for other applications.

In step 411, the server extracts a group of facial features from the video data. In accordance with some embodiments, extracting the group of facial features from the video data includes recognizing the human face from the video data. For example, the server identifies a region in every video frame as the face region. The process of identifying face region involves adjusting for different lightness distribution, angles of the cameras and the movements of the human face during the video recording process. Once the face region is identified, the server begins to extract facial features from the identified face region. The extraction process can utilize various algorithms, by recognizing brightness, edges, contour, etc. In accordance of some embodiments, extracting the group of facial features includes determining a boundary for an object on the human face. In some embodiments, extracting the group of facial features includes determining relative positions of multiple objects on the human face. For example, the server first recognizes a human face from other images and objects in the video frames. Then the server recognizes the boundary of the eyes by detecting the brightness, edges and contours on the human face. In accordance with some embodiments, since there are multiple video frames, the server uses the slight difference among frames to achieve certain flexibility of the human face model.

In step 412, the server extracts a group of audio features from the audio data. Some key features to extract include the voice print and other features that identify a person, including, speech rate, formant pattern, frequency of human voice, stress pattern, intonation pattern, rhythm, phoneme duration, zero crossing rate, power spectral density, etc.

In step 413, the server recognizes a sequence of words in the audio data. Common speech recognition techniques can be employed in this step, including, Mel-frequency cepstral coefficients, Linear predictive coding, Zero Crossings with Peak Amplitudes, Hidden Markov Model, principal component analysis, etc. In accordance with some embodiments, recognizing the sequence of words in the audio data comprises dividing audio data into segments, each segment corresponding to a syllable.

In step 421, the server identifies, in a user account database, a first user account whose respective facial features match the group of facial features according to first predefined criteria. The facial features, audio features and a sequence of words associated with a user account are acquired during user registration. The process of acquiring facial features associated with an account are described in steps 101-103 of FIG. 1 and steps 201-203 of FIG. 2 and will not be repeated here. In accordance with some embodiments, first predefined criteria include a similarity test on the difference of each of the facial feature and an empirically based model to statistically and aggregately calculate a total similarity score between two groups of facial features. The empirical based model is built with a large quantity of human faces and a statistical summary of the differences of these faces. Equipped with such a model, a person skilled in the art can provide an algorithm based on the empirical model to quickly and accurately find the first user account whose respective facial features have the highest similarity score with the group of facial features extracted from the video data.

In step 422, the server identifies, in the user account database, a second user account whose respective audio features match the group of audio features according to second predefined criteria. The process of acquiring audio features associated with an account are described in steps 101-103 of FIG. 1 and steps 201-203 of FIG. 2 and will not be repeated here. In accordance with some embodiments, the second predefined criteria include a similarity test on the difference of each of the audio feature and an empirically based model to statistically and aggregately calculate a total similarity score between two groups of audio features. The construction of the empirically based model is facilitated by the fact that each user chooses and reads a unique sequence of words and so that the content of the audio data is often different. Once the model has been built, a person skilled in the art can provide an algorithm based on the empirical model to quickly and accurately find the second user account whose respective audio features have the highest similarity score with the group of audio features extracted from the audio data.

In step 431, the server determines whether the first user account is the same as the second user account.

In step 441, if the first user account is not the second user account, it indicates that the user who tries to connect with the server does not completely match an account in the databases of the server. The server returns a response to the mobile device, indicative of the denial of the login request.

In step 442, if the first user account is the same as the second user account, the server acquires a predefined sequence of words associated with the first account. In accordance with some embodiments, a user submits a sequence of words to the server in registration. The sequence of words can be a password having combinations of letters, numbers and symbols, an answer to a security question, or any information that is provided by the user during the registration. The sequence of words is submitted by the user during registration.

In step 451, in accordance with some embodiments, the server compares the recognized sequence of words with a predefined sequence of words associated with the first user account.

In accordance with some embodiments, the sequences of words are compared directly. In accordance with some other embodiments of 451, the pronunciation of the sequence of words associated with the first user account is compared with the audio data. A speech model is constructed to compare the pronunciation of the sequence of words to the audio data. If the similarity between the pronunciation and the audio data is above a predefined threshold, the result is the same as if the recognized sequence of words matches the predefined sequence of words. If the similarity between the pronunciation and the audio data is not above a predefined threshold, the result is the same as if the recognized sequence of words does not match the predefined sequence of words.

In some embodiments, the similarity between the pronunciation of the sequence of words and the audio data is expressed in the form of confidence levels of a statistical model. For example, the server may set the confidence level at 99.99%. Then if according to a statistical model and based on comparison between the pronunciation and audio data, it is 99.99% or more likely that the sequence of words in the audio data is the same with the sequence of words associated with the user account, the similarity is deemed to be above the threshold.

In step 461, if the recognized sequence of words does not match the predefined sequence of words according to the third predefined criteria, the server returns a response to the mobile device, indicative of the denial of the login request.

In step 462, the server authenticates the login request if the recognized sequence of words matches the predefined sequence of words according to third predefined criteria.

According to the embodiments of methods illustrated in FIGS. 1, 2, and 4, a user's video data and audio data is collected simultaneously, which frees the user from manually entering user ID or password. The method of the invention substantially simplifies the log in process and enhances user experience.

Further, because both facial recognition and speech recognition are employed, the method is more reliable. Requesting the user to speak a predefined sequence of words increases security since a leak of the predefined sequence of words and account along does not lead to unauthorized login.

FIG. 5 is a diagram of an example implementation of a server computer in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the server computer 500 includes one or more processing units (CPU's) 502, one or more network or other communications interfaces 508, a display 501, memory 505, and one or more communication buses 504 for interconnecting these and various other components. The communication buses may include circuitry (sometimes called a chipset) that interconnects and controls communications between system components. The memory 505 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 505 may optionally include one or more storage devices remotely located from the CPU(s) 502. The memory 505, including the non-volatile and volatile memory device(s) within the memory 505, comprises a non-transitory computer readable storage medium.

In some implementations, the memory 505 or the non-transitory computer readable storage medium of the memory 505 stores the following programs, modules and data structures, or a subset thereof including an operating system 515, a network communication module 518, an identification program 520, and an authentication program 522.

The operating system 515 includes procedures for handling various basic system services and for performing hardware dependent tasks.

The network communication module 518 facilitates communication with other devices via the one or more communication network interfaces 508 (wired or wireless) and one or more communication networks, such as the internet, other wide area networks, local area networks, metropolitan area networks, and so on.

The identification program 520 is configured to identify a user account from the video data and audio data received from the mobile device. The identification program 520 includes facial feature module 530, audio feature module 532, and feature comparison module 534. The facial feature module 530 is configured to extract a group of facial features from the video data as illustrated in step 411 in FIG. 4. The facial feature module 530 includes facial extraction algorithm 540.

The audio feature module 532 is configured to extract a group of audio features from the audio data as illustrated in step 412 in FIG. 4. The audio feature module 532 includes an audio extraction algorithm 541.

The feature comparison module 534 is configured to identify a first user account whose respective facial features match the group of facial features and identify a second user account whose respective audio features match the group of audio features, as illustrated in steps 412 and 422 in FIG. 4.

The feature comparison module 534 includes facial feature database 542, an audio feature database 543, facial comparison algorithm 544, and audio comparison algorithm 545. The facial feature database 542 and the audio feature database 543 are either separate or located within the same user account database. The facial feature database 542 stores groups of facial features and information of the user accounts that are associated with groups of facial features. The facial comparison algorithm 545 is configured to receive a group of facial features from the facial feature module 530 and identify, in the facial feature database 542, the user account whose respective facial features match the group of facial features received from the facial feature module 530. The audio feature database 543 stores groups of audio features and information of the user accounts that are associated with groups of audio features. The audio comparison algorithm 545 is configured to receive a group of audio features from the audio feature module 530 and identify, in the audio feature database 543, the user account whose respective audio features match the group of audio features received from the audio feature module 530.

The authentication program 522 includes a speech recognition module 536 and an account database 538. In accordance with some embodiments (but not shown in FIG. 5), the account database 538 also includes the facial feature database 542 and audio feature database 543. The speech recognition is configured to recognize a sequence of words from audio data as illustrated in step 413 in FIG. 4.

It is important to note that, while in most described embodiments, the server communicates and obtains video and audio data from a mobile device, the device can be any client device of the server, including a PC or a web client.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention.

As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
  at a server having one or more processors and memory storing programs executed by the one or more processors:
    receiving a login request from a mobile device, the login request including video data and audio data;
    extracting a group of facial features from the video data;
    extracting a group of audio features from the audio data and recognizing a sequence of words in the audio data;
    identifying, in a user account database, a first user account whose respective facial features match the group of facial features according to first predefined criteria;
    identifying, in the user account database, a second user account whose respective audio features match the group of audio features according to second predefined criteria;
    if the first user account is the same as the second user account:

comparing the recognized sequence of words with a predefined sequence of words associated with the first user account;

authenticating the login request if the recognized sequence of words matches the predefined sequence of words according to third predefined criteria; and if the recognized sequence of words does not match the predefined sequence of words according to the third predefined criteria, returning a first response to the mobile device, indicative of the denial of the login request; and if the first user account is different from the second user account:

returning a second response to the mobile device, indicative of the denial of the login request.

2. The method of claim 1, wherein the video data comprises multiple frames of images that contain the same human face.

3. The method of claim 2, wherein extracting the group of facial features from the video data includes recognizing the human face from the video data.

4. The method of claim 2, wherein extracting the group of facial features includes determining a boundary for an object on the human face.

5. The method of claim 2, wherein extracting the group of facial features includes determining relative positions of multiple objects on the human face.

6. The method of claim 1, wherein the audio data includes a human voice.

7. The method of claim 6, wherein recognizing the sequence of words in the audio data comprises dividing audio data into segments, each segment corresponding to a syllable.

8. The method of claim 6, wherein the group of audio features comprise frequency of the human voice.

9. A server computer, comprising:
one or more processors:
memory; and
one or more programs stored in the memory and to be executed by the processor, the one or more programs including instructions for:
receiving a login request from a client device, the login request including video data and audio data;
extracting a group of facial features from the video data;
extracting a group of audio features from the audio data and recognizing a sequence of words in the audio data;
identifying, in a user account database, a first user account whose respective facial features match the group of facial features according to first predefined criteria;
identifying, in the user account database, a second user account whose respective audio features match the group of audio features according to second predefined criteria;
if the first user account is the same as the second user account:
comparing the recognized sequence of words with a predefined sequence of words associated with the first user account;
authenticating the login request if the recognized sequence of words matches the predefined sequence of words according to third predefined criteria; and
if the recognized sequence of words does not match the predefined sequence of words according to the third predefined criteria, returning a first response to the mobile device, indicative of the denial of the login request; and if the first user account is different from the second user account:

returning a second response to the client device, indicative of the denial of the login request.

10. The server computer of claim 9, wherein the video data comprises multiple frames of images that contain the same human face.

11. The server computer of claim 10, wherein extracting the group of facial features from the video data includes recognizing the human face from the video data.

12. The server computer of claim 10, wherein extracting the group of facial features includes determining a boundary for an object on the human face.

13. The server computer of claim 10, wherein extracting the group of facial features includes determining relative positions of multiple objects on the human face.

14. The server computer of claim 9, wherein the audio data includes a human voice.

15. The server computer of claim 14, wherein recognizing the sequence of words in the audio data comprises dividing audio data into segments, each segment corresponding to a syllable.

16. The server computer of claim 14, wherein the group of audio features comprise frequency of the human voice.

17. A non-transitory computer readable storage medium, storing one or more programs for execution by one or more processors of a computer system, the one or more programs including instructions for:
receiving a login request from a mobile device, the login request including video data and audio data;
extracting a group of facial features from the video data;
extracting a group of audio features from the audio data and recognizing a sequence of words in the audio data;
identifying, in a user account database, a first user account whose respective facial features match the group of facial features according to first predefined criteria;
identifying, in the user account database, a second user account whose respective audio features match the group of audio features according to second predefined criteria;
if the first user account is the same as the second user account:
comparing the recognized sequence of words with a predefined sequence of words associated with the first user account;
authenticating the login request if the recognized sequence of words matches the predefined sequence of words according to third predefined criteria; and
if the recognized sequence of words does not match the predefined sequence of words according to the third predefined criteria, returning a first response to the mobile device, indicative of the denial of the login request; and if the first user account is different from the second user account:

returning a second response to the mobile device, indicative of the denial of the login request.

18. The computer-readable storage medium of claim 17, wherein the video data comprises multiple frames of images that contain the same human face.

19. The computer-readable storage medium of claim 18, wherein extracting the group of facial features from the video data includes recognizing the human face from the video data.

20. The computer-readable storage medium of claim 18, wherein extracting the group of facial features includes determining a boundary for an object on the human face.

* * * * *